United States Patent Office 3,372,124
Patented Mar. 5, 1968

3,372,124
CORROSION INHIBITORS
Theodore E. Majewski, Midland, Mich., assignor to The Dow Chemical Company, Midland, Mich., a corporation of Delaware
No Drawing. Original application Apr. 21, 1965, Ser. No. 449,886, now Patent No. 3,318,909. Divided and this application Aug. 10, 1966, Ser. No. 615,270
7 Claims. (Cl. 252—77)

ABSTRACT OF THE DISCLOSURE

Aqueous glycol antifreeze compositions are rendered non-corrosive to metals by the inclusion of a small proportion of a 2-(cyclohexylimino)-1-hydrocarbyl-pyrrolidine.

This is a division of my copending application filed Apr. 21, 1965, Ser. No. 449,886.

This invention relates to new compositions of matter, to the preparation of such compositions, and to the use of these compositions as metal corrosion inhibitors. More particularly, the present invention relates to novel 2-(cycloalkylimino)-1-alkyl (or aryl) pyrrolidine compounds and to the use of these compounds as corrosion inhibitors for aqueous glycol compositions.

The compounds of the invention are prepared according to the following reaction:

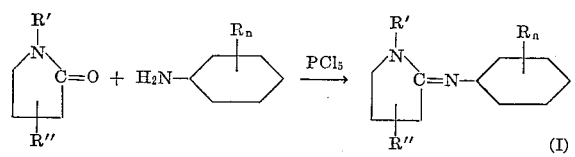

wherein each R is independently a lower alkyl group of from 1 to 4 carbon atoms (such as a methyl, ethyl, n-propyl, i-propyl, n-butyl, i-butyl, sec.-butyl and tert.-butyl group), $n$ is an integer of from 0 to 3 (preferably from 0 to 1) which represents the number of alkyl substituents bonded to the cyclohexyl ring, R' is an alkyl or aryl containing group of up to about 8 carbon atoms, and R" represents a hydrogen atom or a methyl group. In reaction (I), all carbon atoms of the cyclohexyl ring and heterocyclic ring which are not attached to alkyl groups are bonded to hydrogen atoms. The pyrrolidone ring contains no more than a single methyl substituent and is preferably unsubstituted. R' may be an alkyl group of from 1 to 8 carbon atoms of the formula $+C_kH_{2k+1})$ wherein $k$ is an integer of from 1 to 8 (such as methyl, ethyl, n-propyl, i-propyl, n-butyl, sec.-butyl, i-butyl, tert.-butyl, n-pentyl, n-hexyl, n-heptyl, i-octyl, n-octyl) or an aryl containing group of from 6 to 8 carbon atoms (such as a phenyl, benzyl, phenethyl, o-, m-, or p-tolyl, and xylyl group). Typical cyclic amines which may be reacted with N-alkyl-pyrrolidones or N-aryl-pyrrolidones include cyclohexylamine, 1,3,5-trimethyl-cyclohexylamine, 3-ethyl-cyclohexylamine, 2-tert.-butyl-cyclohexylamine and 2-methyl-3-ethylcyclohexylamine. For example, N-phenyl-pyrrolidone or N-octyl-pyrrolidone may be reacted with cyclohexylamine to yield the corresponding 2-(cyclohexylimino)-1-phenyl pyrrolidine and 2-(cyclohexylimino)-1-n-octyl pyrrolidine, respectively.

The compounds of the invention are prepared by combining approximately equimolar amounts of N-alkyl-pyrrolidone (or N-aryl-pyrrolidone), cyclohexylamine (or an alkyl-substituted cyclohexylamine) and PCl₅ in a suitable reaction vessel and then heating the mixture at a temperature of from about 40° to 150° C. An excess of PCl₅ may be used in the reaction. The reaction is generally carried out in a suitable inert solvent (e.g., chloroform, methylchloroform, etc.) under reflux conditions.

The compounds of the invention are useful as corrosion inhibitors in aqueous glycol antifreeze systems. The compounds are especially useful as inhibitors when incorporated in aqueous glycol systems which will be in contact with materials which are used in automobile radiators. Such materials include metals such as copper and aluminum as well as alloys such as brass and solder. When used to retard corrosion in such systems, the concentration of the inhibitor in the aqueous medium may vary depending upon the particular corrosion problem involved. Only an inhibiting amount of cycloalkylimino-substituted pyrrolidine is required. Generally, amounts of up to about 50–75 percent by weight (based upon the total weight of the glycol in the inhibited aqueous medium) have been found satisfactory. The concentration of the inhibitor is preferably from about .001 to 5.0 percent by weight based upon the glycol content (weight) of the composition which is to contact the metal. The compounds are especially advantageous corrosion inhibitors at elevated temperatures (from room temperatures up to about 125° C.).

The following examples are submitted for the purpose of illustration only and are not to be construed as limiting the scope of the invention in any way.

*Example I.—Preparation of 2-(cyclohexylimino)-1-methyl pyrrolidine*

A sample of 39.6 grams (0.4 mole) of N-methyl pyrrolidone in 50 milliliters of chloroform was added slowly to 150 milliliters of chloroform containing 120 grams (0.56 mole) of phosphorus pentachloride. The temperature was held below 20° C. during the addition. A total of 39.7 grams (0.4 mole) of cyclohexylamine in 50 milliliters of chloroform was then added to the mixture. The mixture was heated to reflux (about 60–62° C.) and held under reflux conditions for 9 hours. The reaction mixture was cooled (using an ice water bath) and water was added slowly to the mixture to decompose any unreacted phosphorus pentachloride. Methylene chloride was added and the resulting layers were separated. The methylene chloride layer was extracted three times with water. The water extracts were made basic with sodium hydroxide solution (6 Normal) and then extracted three times with methylene chloride. The methylene chloride extracts were dried overnight over sodium sulfate, filtered, and the methylene chloride evaporated by heating the mixture on a steam bath leaving 2-(cyclohexylimino)-1-methyl pyrrolidine which distilled at 73.0°–74.0° C. (0.7 mm.).

Nitrogen analysis: Percent by weight
Calculated for $C_{11}H_{20}N_2$ _____ 15.54
Found for $C_{11}H_{20}N_2$ _____ 15.16

Pyrrolidine compounds in which the cyclohexyl ring contains one or more alkyl substituents are similarly prepared by reacting N-methyl pyrrolidone with 2-methyl-cyclohexylamine, 3-ethyl-cyclohexylamine and 2,5-dimethyl-cyclohexylamine.

*Example II*

Metal coupons (copper, solder, brass, and cast aluminum) were suspended in an aqueous medium composed of 25 percent by weight of ethylene glycol in ordinary tap water. The copper, solder, and brass coupons were approximately 1 inch x 2 inches x 1/16 inch. The cast aluminum coupons were 1 inch x 2 inches x 1/8 inch. A sufficient amount of 2-cyclohexylimino-1-methyl pyrrolidine (obtained from Example I) was added to the aqueous glycol medium to give an inhibitor concentration of .24 percent by weight. Electrolytic cells were formed using one of the metal coupons as an anode with platinum as the cathodic material. The inhibited aqueous glycol medium was placed in the cell covering the electrodes. The solution was then heated to 160° F. with stirring and a current of one milliamp (at 4 volts) was passed through the cell for a three-hour period. After this time, the metal coupons were observed visually to determine whether pitting had occurred or if deposits had built up on the coupons.

Using the inhibited aqueous glycol medium, no pitting or deposits were found after this accelerated corrosion test procedure using anodes of copper, aluminum, solder or brass. The same aqueous glycol medium without 2-cyclohexylimino-1-methyl pyrrolidine showed either deposit formation and/or pitting on all these metals when subjected to identical electrolytic conditions at the same temperature.

The compositions of the standard metal test coupons which are used in the accelerated (electrolytic) corrosion tests are given in the following ASTM specifications:

(1) Copper _____ Alloy type ETP (electrolytic tough pitched copper) or STP (silver-bearing copper, tough pitch); ASTM B152.
(2) Solder _____ Alloy Grade 30A or 30B of ASTM B32.
(3) Brass _____ Alloy No. 8 of ASTM B36.
(4) Cast aluminum ____ Alloy SC64C of ASTM B179.

I claim as my invention:

1. An aqueous glycol antifreeze composition containing an amount sufficient to inhibit the corrosion of metals in contact therewith of an inhibitor having the formula

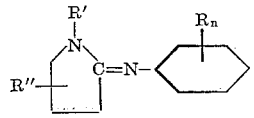

wherein $n$ is an integer from 0 to 3 representing the number of R groups bonded to the cyclohexyl ring; each R is independently an alkyl group of 1 to 4 carbon atoms; R' is an alkyl or aryl group of no more than 8 carbon atoms; and R'' is methyl or hydrogen.

2. A composition as defined in claim 1 wherein $n$ is 0 and R'' is hydrogen.
3. A composition as defined in claim 2 wherein R' is methyl or phenyl.
4. A composition as defined in claim 3 wherein R' is methyl.
5. A method of retarding the corrosion of metals in contact with an aqueous glycol antifreeze solution which comprises incorporating into said solution a corrosion inhibiting amount of a compound of the formula

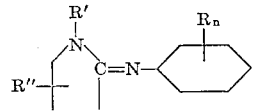

wherein $n$ is an integer from 0 to 3 representing the number of R groups bonded to the cyclohexyl ring; each R is independently an alkyl group of 1 to 4 carbon atoms; R' is an alkyl or aryl group of no more than 8 carbon atoms; and R'' is methyl or hydrogen.

6. The method of claim 5 wherein $n$ is 0 and R'' is hydrogen.
7. The method of claim 6 wherein R' is methyl or phenyl.

No references cited.

LEON D. ROSDOL, *Primary Examiner.*

S. D. SCHWARTZ, *Assistant Examiner.*